(12) United States Patent
Vossoughian

(10) Patent No.: US 8,554,931 B1
(45) Date of Patent: Oct. 8, 2013

(54) METHOD AND SYSTEM FOR COORDINATING NETWORK RESOURCES FOR BLENDED SERVICES

(75) Inventor: Matt M. Vossoughian, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1558 days.

(21) Appl. No.: 11/837,635

(22) Filed: Aug. 13, 2007

(51) Int. Cl.
*G06F 15/16* (2006.01)
(52) U.S. Cl.
USPC .................. 709/229; 709/223; 379/142.05
(58) Field of Classification Search
USPC ............................. 709/223, 229; 379/142.05
See application file for complete search history.

(56) References Cited

U.S. PATENT DOCUMENTS

| | | | | |
|---|---|---|---|---|
| 7,463,620 B2 * | 12/2008 | Wang et al. | ............ | 370/352 |
| 7,492,882 B1 * | 2/2009 | Sripathi et al. | ............ | 379/201.01 |
| 7,634,259 B2 * | 12/2009 | Shienbrood et al. | ............ | 455/418 |
| 8,032,609 B2 * | 10/2011 | Rogers et al. | ............ | 709/217 |
| 8,121,126 B1 * | 2/2012 | Moisand et al. | ............ | 370/392 |
| 2006/0116125 A1 * | 6/2006 | Buckley et al. | ............ | 455/435.1 |
| 2008/0307081 A1 * | 12/2008 | Dobbins et al. | ............ | 709/223 |

* cited by examiner

*Primary Examiner* — David Lazaro
*Assistant Examiner* — Marie Georges Henry

(57) ABSTRACT

A method and system for coordinating allocation of network resources requested by a user for blended services. A plurality of service request messages are received by a network entity, the request messages corresponding to a plurality of services requested by the user. The total network resource requirements for the plurality of services is determined at the network entity, and a resource request is sent from the network entity to a resource management element in the network. If the total network resource requirements are successfully reserve, then the network entity proceeds with processing the request, for example by sending service initiation requests to one or more network servers on which the services are hosted. The network entity may thus keep a tally of all network resource requirements concurrently allocated to a user during delivery of the requested services.

26 Claims, 5 Drawing Sheets

METHOD AND SYSTEM FOR COORDINATING NETWORK RESOURCES FOR BLENDED SERVICES

FIELD OF THE INVENTION

The present invention relates to blended services in a communication network, and more particularly, to coordinating the network resources required by blended services that are invoked by or on behalf of a user in the network.

BACKGROUND

The advent and evolution in recent years of technologies and standards for high-rate transmission of packet data over cellular radio access networks has been part of a larger picture that includes advances in the development of packet transport networks and service networks for delivery of packet-data services, all collectively referred to as "third generation" (3G) networks. In the context of the larger picture, there have been industry-wide efforts to coordinate various elemental functions and subsystems within a common architectural framework and based upon common, standard interfaces and protocols for communication. Industry consortia including the $3^{rd}$ Generation Partnership Project (3GPP) and the 3GPP2, among others, have developed and published specifications relating to numerous aspects of 3G networks, from access devices, to access networks, to core transport networks, to service-delivery networks, as well as the communication methods that form the basis for network operation and services.

Packet-data transport and services in 3G networks are based in a large part on the "Internet Protocol" (IP) and the IP suite of protocol standards. As such, 3G networks themselves incorporate IP networks. In particular, IP-packet-based media services, such as "Voice over IP" (VoIP), video streaming, and packet-media broadcast collectively comprise an "IP Multimedia Subsystem" (IMS) network within a 3G system. Built upon standard signaling protocols, such as Session Initiation Protocol (SIP), standard media transport protocols, such as Real-time Transport Protocol (RTP), and standard policy management protocols such as Common Open Policy Service (COPS), among others, the IMS network provides an infrastructure for integrating new and emerging IP-based services for subscribers in 3G networks. In turn, owners and operators of 3G networks can generate revenue by charging subscribers for IMS-based services according to one or more fee structures, for example.

SUMMARY

As the number and types of services available to a user through an IMS network increases, possible interactions between services that are invoked or executed at the same time may become more numerous and more complex. The actions of two different services may not make sense or may even conflict when combined as a result of concurrent invocation of the services by a user. In some instances, individual services, which typically run as applications on servers, may assume that they are in direct control of media communications with a user, while remaining unaware that other applications are attempting to control or manipulate media communications with the same user. To help alleviate possible adverse service interactions, the IMS network may include an element that resides in the signaling path between the user (or some entity that invokes services on behalf of the user) and the various application servers that host the services. Referred to generally as a "service broker," this element acts to coordinate service requests and related signaling messages in order to ensure that multiple services invoked concurrently for a given user do not result in conflicting or nonsensical combined actions.

Within the context of the IMS network defined by 3GPP and 3GPP2, the service broker may be implemented in a network component called the "Service Capability Interaction Manager," or "SCIM." The SCIM acts to orchestrate multiple service requests invoked by or on behalf of a given user by verifying that the user is authorized to invoke the services, and interpreting and possibly modifying the service requests to prevent or resolve conflicting actions by the different services of the requests. In particular, multiple IMS services that can interact with one another via mutual invocation (i.e., one invoking the other), or through use of a common service or resource, for example, are called "blended services." In the course of helping to set up or launch blended services for a user, the SCIM may communicate with one or more user authorization servers and one or more application servers.

An important aspect of such real-time services as voice or video streaming is the level of quality with which the services are delivered to the user. So-called "Quality of Service" (QoS) in turn depends, in part, on the availability of sufficient network resources to support services when they are invoked. Network resources required by real-time services could include network transport capacity (commonly referred to as "network bandwidth"), discrete transport channels, and media processing capacity, to name a few. In turn, these (and other) network resources may be provided and/or managed by various network elements, including, without limitation, policy servers, resource managers, and network routers that interconnect different network segments or transport links.

One approach to ensuring resource-related QoS is to evaluate the network resource requirements of a service at the time the service request is made, and then reserve those required resources prior to or as part of the process of carrying out (or honoring) the service request. In the IMS network, the resource reservation procedure is facilitated, in part, by a "Policy Decision Function" (PDF) that processes each request for network resources by comparing the network resources requested to what is actually available when the request is made, and also by filtering the request according to settable policy. The actual resources are typically associated with network components that introduce or route traffic in the network, such as border routers between two networks, internal (core) routers, and channel interface controllers, for example, or with elements that may process media (or other) data. Reservation and allocation of the actual resources may be controlled by one or more "Policy Enforcement Points" (PEPs) associated with the network components that operate to provide the resources. In turn, PEPs communicate with the PDF in order to coordinate network-wide management and allocation of network resources.

While procedures exist in the IMS network for management and allocation of network resources for individual service requests, coordination of the reservation and allocation of network resources for blended services remains problematic. In particular, it is possible for multiple entities, including signaling servers initiating service requests and service delivery platforms acting to launch services in response to requests, to individually communicate with a PDF in order to reserve resources for a plurality of services. Moreover, acting individually, these (and possibly other) entities may need access to user account data for authorizing user requests. Yet even though a plurality of service requests may correspond to a blend of services requested by a given user, there is no one entity or function in the IMS network that incorporates the actions of brokering service requests from that user with validating those requests against a total of network resources already reserved for and/or allocated to the same user. Even the SCIM, in orchestrating service requests and resolving possible adverse service interactions, typically only checks a given user's service authorization, but does not validate resource reservation on a request-by-request basis nor keep a running tally of resources already allocated to that user. Consequently, through invocation of a plurality of concurrent (blended) services, it may be possible for a given user to acquire more total network resources than he or she is entitled to according, for example, to a service level agreement. Other problems and issues may arise as a result of improper or inadequate tracking of concurrent, per-user network resources in an IMS network.

Accordingly, the present invention is directed to a method and system for coordinating allocation and management of network resources requested by or on behalf of a user in communication network, such as an IMS network. A given user (or an agent acting on behalf of the user) may issue multiple services requests in the context of invoking blended services. According to the present invention, a network entity, such as a SCIM, will receive and coordinate all such requests, whereby it will be to keep a running tally on all network resources allocated to users, including the given user. In particular, the total network resources allocated at any one time to a given user will be tracked and compared to an amount (and possibly types) of network resources that the user is authorized to acquire. A decision to honor or deny service requests from a user may then be based, at least in part, on whether or not the user is allowed to acquire the total amount and types of network resources required by the associated services so requested.

Hence, in one respect, the invention is directed to method for coordinating network resources for blended services in a network, wherein the method comprises receiving at a network entity a plurality of service requests from a user to initiate a corresponding plurality of services for the user, each respective service request being associated with a respective service of the plurality of services. The method also comprises, at the network entity, determining a respective network resource requirement for each service, and further, computing a total network resource requirement for all of the requested services. Once the total network resources are determined, the network entity then carries out the step of sending to a resource management element in the network a request for reservation of the total network resource requirement. By way of example, the network entity could be a SCIM, and the resource management element could be a PDF, wherein communications between the two is supported by COPS.

Upon receiving a response from the resource management element, the network entity may then grant the plurality of service requests if the response indicates that the resource reservation request was successful. Granting each request may entail the network entity identifying a corresponding network server for each requested service, and then sending to it an appropriate service-initiation request on behalf of the user. For example, a media session that involves a particular media server might be requested. The session could be based on RTP, and the service initiation request could be a SIP INVITE message. Further, the request itself could be made on behalf of the user, for instance by an ISM signaling entity such as a SIP proxy server or a "Call Session Control Function" (CSCF). Additionally, in communicating with the media server (or other service delivery platforms), the network entity may act as a gateway, providing intermediary communications between the server and other elements in the network.

In accordance with a preferred embodiment, the method further comprises, at the network entity, making a determination of whether the user is authorized to reserve at least the total network resource requirement, and carrying out the step of sending the resource request only if such authorization is verified. Note that the authorization determination is thus preferably carried out prior to the step of sending the resource request. Moreover, making the authorization determination could involve sending a resource authorization request from the network entity to an authorization server in the network, and subsequently receiving a response from the authorization server. The resource authorization request could contain information indicative of the user, the total network resource requirement, and the plurality of services, while the response might contain an indication of whether or not the user is authorized to reserve at least the total network resource requirement. The authorization server could be, without limitation, an "Authentication Authorization Accounting" (AAA) server, or a "Home Subscriber Server" (HSS).

In further accordance with the preferred embodiment, each requested service may itself use more than one type of network resource, so that the steps of determining and computing the network requirement for each service may involve consideration of different types of resources. Examples of resource types include, without limitation, network bandwidth, air channel capacity, network capacity, and virtual circuits. Further, the resource request from the network entity to the resource management element could be sent as a plurality of requests corresponding to the plurality of requested services, or as a single, unified request.

The method could also be used to facilitate billing for blended services. For instance, a further step could comprise sending a message from the network entity to a billing and accounting server in the network. The message could contain information indicative of the user, the total network resource requirement, and the plurality of services. In turn, the billing and accounting server could use the message to determine one or more charges to apply to the user for the plurality of services.

In another respect, the invention is directed to method for coordinating network resources for blended services in a network, wherein the method comprises receiving in a sequence a plurality of service requests at a network entity. Again, the requests originate from a user and are for initiation of a corresponding plurality of associated services. The method also comprises, at the network entity, responsive to receiving each request, determining a respective network resource requirement for each associated service, and adding the respective network resource requirement into a running a total network resource requirement for the services associated with all service requests of the plurality of service requests so far received. After adding each increment to the running total, the network entity then carries out the step of sending a resource request from the network entity to a resource management element in the network for reservation of the respective network resource requirement.

Upon receiving a response from the resource management element, the network entity may then grant the respective service request if the response indicates that the resource reservation request was successful. Granting the respective request may entail the network entity identifying a corresponding network server, and then sending to it an appropriate service-initiation request on behalf of the user. Again, the request could involve an RTP session with a media server, and the service initiation request could be a SIP INVITE message.

In accordance with a preferred embodiment, the method further comprises, at the network entity, making a determination of whether the user is authorized to reserve at least the running total network resource requirement, and carrying out the step of sending the resource request only if the authorization is verified. As in the previously-described embodiment, the authorization determination is a precondition to the sending of the resource request, and making the authorization determination could involve sending a resource authorization request from the network entity to an authorization server in the network and subsequently receiving a response from the authorization server. In the current embodiment, the resource authorization request could contain information indicative of the user, the running total network resource requirement, and the service associated with the respective request, while the response might contain an indication of whether or not the user is authorized to reserve at least the running total network resource requirement.

In further accordance with the current embodiment, each of the requested services may itself use more than one type of network resource, so that the steps of determining and computing the network requirement for each service may involve consideration of different types of resource. Again, examples of resource types include, without limitation, network bandwidth, air channel capacity, network capacity, and virtual circuits.

In yet a further respect, the present invention is directed to a system for coordinating network resources for blended services in a network. The system may comprise a processor, a network interface, data storage, and machine language instructions stored in the data storage and executable by the processor to perform functions corresponding to various aspects of the method embodiments described above. In particular, the machine language instructions may be executable by the processor to receive, via the network interface, a plurality of service requests from a user to initiate a corresponding plurality of services for the user. Each respective service request may be associated with a respective service of the plurality of services. Responsive to receipt of each respective service request, the machine language instructions may be further executable by the processor to determine a respective network resource requirement for the associated service, add the respective network resource requirement into a running a total network resource requirement for the services associated with all service requests of the plurality of service requests so far received, and via the network interface, send a resource request to a resource management element in the network for reservation of the respective network resource requirement.

In accordance with an exemplary embodiment of the system, the machine language instructions may be further executable by the processor to make an authorization determination as to whether the user is authorized to reserve at least the running total network resource requirement, and to send the resource request only if the authorization is verified. The determination may thus be made prior to sending the resource request, and may be carried out by execution on the processor of machine language instructions that send a resource authorization request to an authorization server in the network and subsequently receive a response from the authorization server. Preferably, the communications are carried out via the network interface. By way of example, the request may contain information indicative of the user, the running total network resource requirement, and the service associated with the respective service request. In turn, the response may contain at least an indication of whether or not the user is authorized to reserve at least the running total network resource requirement.

As yet a further aspect of the exemplary system, the machine language instructions stored in the data storage may be executable by the processor to receive, via the network interface, a response from the network resource manager indicating whether or not reservation of the respective network resource requirement was successful, and to grant the respective service request only if the response indicates that reservation of the respective network resource requirement was successful. In granting a respective service request, the machine language instructions may be executable by the processor to identify a service element in the network that functions to deliver the service associated with the respective service request, and via the network interface, to send a service-initiation request to the corresponding service element to initiate the service on behalf of the user.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Figure 1:
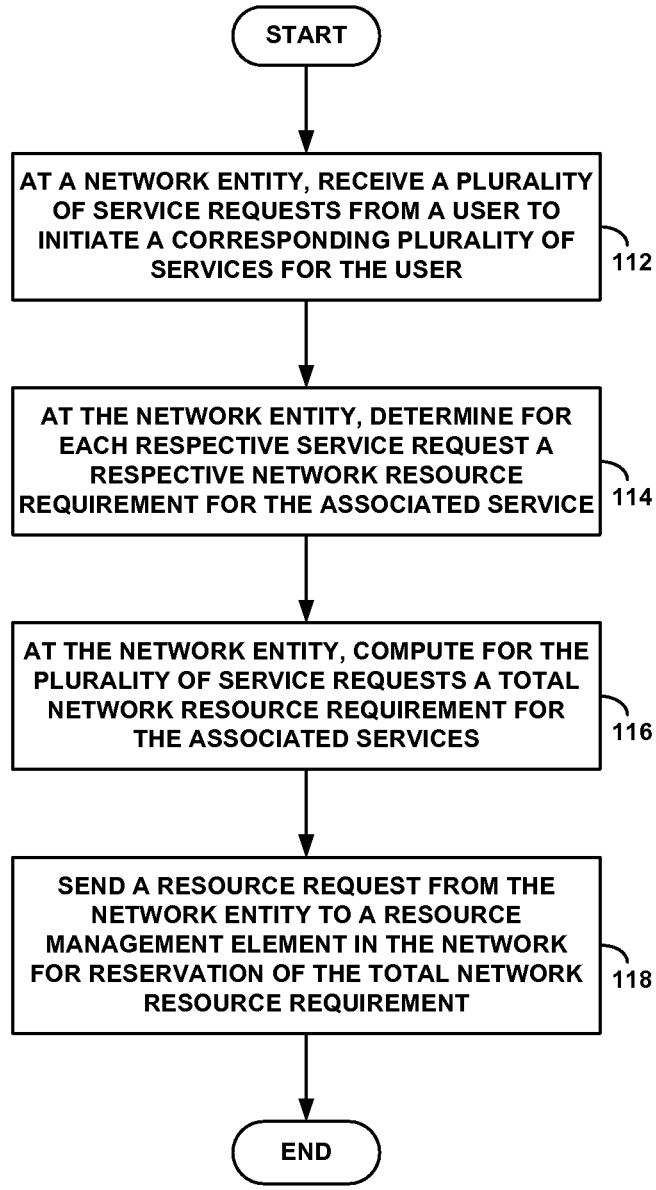
FIG. 1 is an exemplary flowchart of the method for coordinating network resources requested by a user for blended services in a network.

An exemplary embodiment of the present invention is illustrated in the form of a flowchart in FIG. 1. At step 112, a plurality of service requests is received at a network entity from a user or from an intermediary acting on behalf of the user. The plurality of requests preferably corresponds to a plurality of services, each requested service being an IMS-based service, for instance. In the exemplary embodiment, the network entity could be a SCIM and the intermediary, if any, could be a SIP proxy server or a CSCF.

In practice, the plurality of service requests may correspond to a plurality of concurrent, blended media services that the user seeks to invoke. For example, the user may wish to initiate a VoIP conference call blended with a video link to one of the participants in the call, and at the same time feed in an audio stream of an IP radio broadcast. The requests may be sent as SIP INVITE messages from the user's wireless communication device, which incorporates a SIP user agent, to a CSCF in the network. Following any necessary processing or interpretation of the SIP messages, the CSCF may then send the requests to the SCIM (or other network entity).

At step 114, the network entity determines for each respective service request a respective network resource requirement for the associated service. Network resources could include network transport capacity (i.e., network "bandwidth"), network interface channels, IP transport connections, and server processing capacity, for instance, and could be supplied or supported by such network elements as routers, Packet Data Serving Nodes (PDSNs), and media servers, among others. The network entity could determine the network resource requirements by interpreting the contents of the service requests, or possibly by querying one or more application or media servers required to deliver the services, for instance.

In the above example, the VoIP call, video link, and audio stream each preferably utilize RTP for media transport, and each may require a minimum amount of network bandwidth in order to achieve a specified level of QoS. As such, the minimum amount of network bandwidth required by each media stream represents one possible type of network resource requirement for each respective service. The IP radio broadcast of the current example may further require resources of a media server for delivery of the requested audio stream. Other types of network resources are possible as well, and any one requested service may require more than one type of resource. Thus, the determination made at step 114 is for all the resources required by each respective service that is requested.

Once the resource requirement for each requested service is determined, the network entity, at step 116, then computes a total network resource requirement for all the services associated with the plurality of requests. Continuing with current example, the total network resource requirement could include the total network bandwidth for all of the three media streams, processing capacity on the media server, as well as other possible network resources that may be required by some or all of the requested services.

At step 118, the network entity sends a resource request to a resource management element in the network. The request includes the total network resource requirement computed at step 116. The network resource management element could be a PDF, for example, and the communication between the network entity (e.g., SCIM) and the PDF could be based on COPS. In functioning to compute the total network resource requirement and to send a request based on the total to the PDF (or other network resource management element), the network entity thus advantageously acts to coordinate the allocation of network resources associated with blended services invoked by or on behalf of a user. In particular, the network entity acts to tally up all the resources that a given user requests (and possibly acquires) in the course of invoking blended services. Further, in communicating with the network resource management element, the network entity advantageously unifies or aggregates otherwise disparate communications between various other service components (e.g., service delivery platforms and signaling servers) and the network resource management element.

Various additional or alternative steps could be included in the embodiment represented in FIG. 1. For instance, the network entity may determine whether or not to grant some or all of the service requests according to a response from the PDF. In practice, the availability of network bandwidth may be dependent on a border router or other network element in the transport path of the media streams. Upon receipt of the resource request from the SCIM, the PDF could check whether or not the border router has the requisite transport capacity, and fashion its response to the SCIM accordingly. The PDF could also determine the availability of other resources in the request, as well. The SCIM (or other network entity) could then decide if the request for the blended service can be accommodated. Further, the resource request could be sent as a series of individual requests, one for each service request, for instance. Alternatively, a single, unified resource request containing the total network resource requirement for the plurality of requested services could be sent.

Still further, prior to sending the resource request (or requests), the network entity could determine whether or not the requesting user is authorized to acquire the total network resource requirement, and then only send the resource request if authorization is verified. As an example, the network entity could send a resource authorization request to a network authorization server, such as a AAA server or an HSS. The authorization check could also be conditioned on the types of resources requested, in addition to or instead of the total. In this way, the network entity would thus act not only to ensure that the total network resource requirement is available for invoking requests for concurrent, blended services, but would also ensure that a given user has sufficient privileges or permissions to even acquire the requisite resources if they are available. Moreover, by communicating with a AAA server or HSS (or other similar element), the network entity could act as an intermediary for other network elements or servers that may similarly require checking user authorizations.

It should be understood that the embodiment depicted in FIG. 1 is illustrative of the invention, and that other embodiments are possible. In one alternative, the plurality of service requests could be received at the network entity in a sequence. For example, a user may first request initiation of a VoIP conference call. At some later time, while the call is still active, the user may issue an additional request to add a video media link with one of the participants of the call. Then at still a later time, the user may request to add a media stream from an IP radio broadcast. Thus, the plurality of requests may grow incrementally in number, with a corresponding incremental growth of the total network resource requirement. For this embodiment, the network entity would determine the network resource requirement for each service request as the request is received, and then keep a running total of network resource requirement for all the services requested. Similarly, the network entity could check user authorization for each service as the corresponding request is received. Moreover, a running tally of total network resources allocated to a given user for concurrent services may increase and decrease as new requests are made or active services terminated and the associated resources released.

In still a further embodiment, the network entity could receive a combination of both simultaneous and sequential service requests. In this case, an appropriate combination of steps could be carried out. I.e., some steps could accommodate a plurality of requests that are received simultaneously, and other steps could accommodate a one or more requests that are received in a sequence. It will be appreciated that exemplary embodiments described above are not intended to be limiting with respect to the scope and spirit of the present invention.

Network Architecture and Client Station Access

Figure 2:
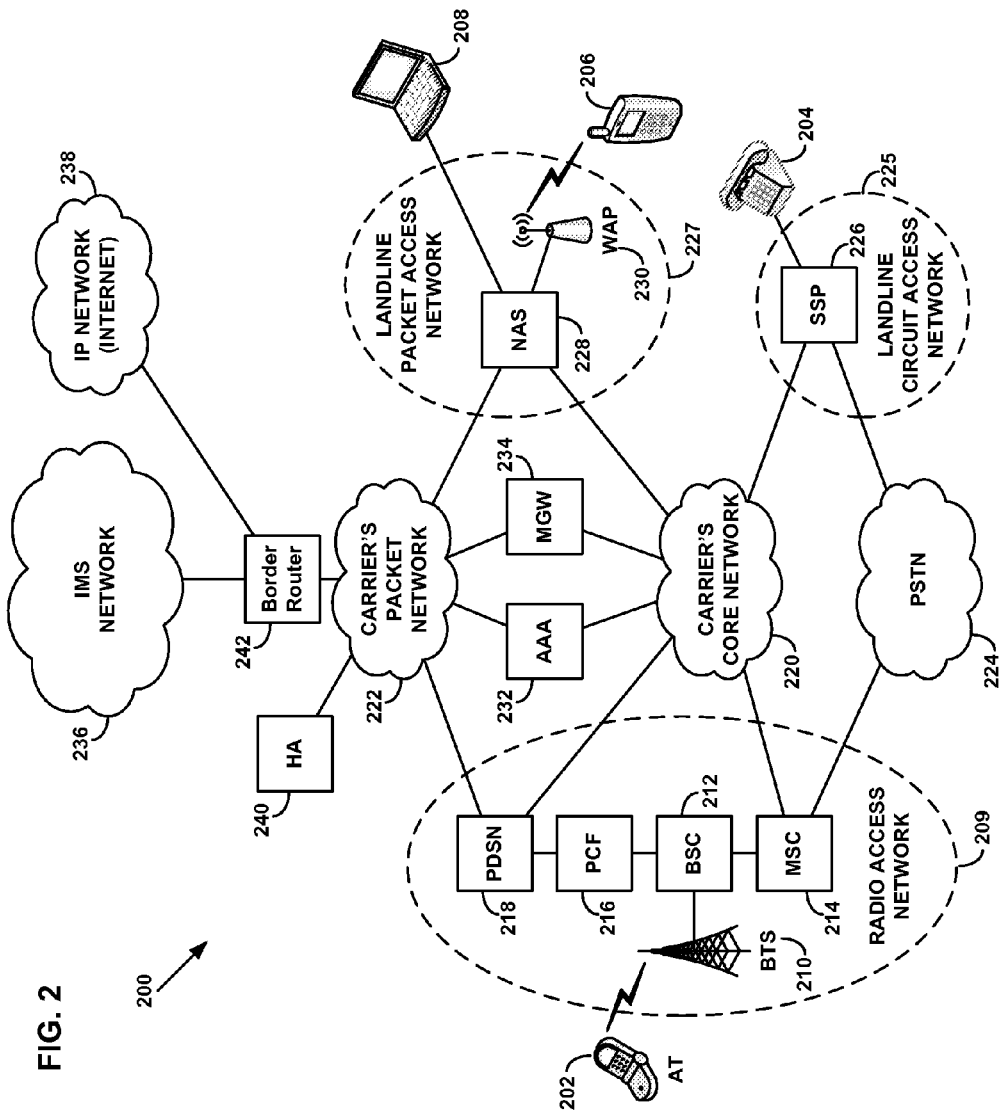
FIG. 2 is an exemplary representation of a carrier network in which coordination of network resources requested by a user for blended services can be carried out, wherein details of the IMS network are omitted.

FIG. 2 illustrates an exemplary telecommunication network 200 in which a service provider could to carry out coordination of network resources requested by a user for blended services. Telecommunication network 200 may be taken as representing a 3G network and includes, by way of example, network elements and components suitable for supporting both circuit-based telecommunication services, such cellular and landline voice calls, and IMS-based packet-based data communication services, such as web browsing, VoIP, voicemail, and e-mail communication.

Example network 200 includes a carrier's core network 220, which is then connected to one or more access networks/systems, such as a radio access network (RAN) 209, landline circuit access network 225, and landline packet access network 227, each of which may allow subscribers to engage in telecommunication services such as voice telephony and data communications. Each of the access networks is coupled, in turn, with one or more transport networks, such as the public switched telephone network (PSTN) 224 and (either directly or through core network 220, via media gateway (MGW) 234) a packet network 222.

The carrier's IMS network 236 is connected to the packet network 222 by way of border router 242, which also provides a connection to an external IP network 238, such as the public Internet. In turn, border router 242 functions in part to enforce traffic policy at the boundaries between the networks that it connects. Related actions of the border router may include monitoring and controlling traffic flow in order to comply with service level agreements (e.g., bandwidth limits) between the connected networks, carrying out security-related procedures, and performing any necessary protocol or address translations, for example.

Core network 220 provides connectivity to various elements, components and entities of network 200, and serves as a transport network for communications among them. Operationally, core network 220 also supports delivery of circuit-based user services and features via signaling and bearer channels, for example, carried over inter-switch digital trunks for regional and long-distance calls. As such, core network 220 may also comprise what is commonly referred to as a backbone network. Core network 220 could be an ATM and/or IP-based network, for example, and could comprise more than one physical and/or logical network and/or sub-network, as well as interconnecting routers and switches. Other transport technologies are possible as well, as are a variety of network topologies and routing/switching protocols and platforms.

In the context of FIG. 2, core network 220 represents at least the communicative coupling of the attached elements shown, as well as other possible entities that are not shown. Note, however, that the exemplary connectivity between network entities provided via core network 220 is not intended to be limiting with respect to other methods or means of communication between any two or more network entities, elements or components. For example, a group of servers and databases (not shown) that supports a coordinated set of functions, such as billing or user account services, could communicate within an IP sub-network or LAN that is itself connected to core network via a router, or the like. Other arrangements are possible as well.

As noted above, exemplary network 200 also includes packet network 222, which may be a different physical network from core network 220, a separate virtual network overlaid on core network 220, or some combination of both. Other arrangements are possible as well. Packet network 222 provides packet-data transport and services to users and to network servers and other network entities that require packet-data communications. In a preferred embodiment, packet network 222 is an IP network, capable of transporting IP-based service, such as web browsing, VoIP, and the like. The services themselves are based in and delivered from the IMS network 236, which is described below in connection with FIG. 3.

Users may access features and services of network 200 via one or more client stations, exemplified in FIG. 2 by client access devices 202, 204, 206, and 208. Each illustrates by way of example a different mode and technology of network access, as well as a different form of client station. For example, access terminal (AT) 202 represents a 3G cellular phone, or the like, that may support both circuit-cellular and packet-data communications using CDMA and/or GPRS/GSM cellular radio access technologies, for instance. Telephone 204 represents a landline telephone, such as one used for circuit-based residential service with a local exchange carrier (LEC). Alternatively, telephone 204 could be a digital PBX phone that accesses the LEC via a PBX switch (not shown), for example. Client station 206 represents a wireless intelligent device, such as a packet-telephony (e.g., VoIP) phone, or the like, with wireless local area network (WLAN) access, such as IEEE 802.11 (also referred to as "wireless Ethernet"), to a packet network. Likewise, client station 208 could be a similar type of intelligent device, but with wired LAN access, such as Ethernet, to a packet network. These example client stations are not meant to be limiting, and other types and/or combinations of devices are possible. For instance, client station 206 could be a personal computer (PC) or workstation having a WLAN interface, and client station 208 could be a wired VoIP phone. Further, AT 202 could incorporate technology for WLAN access as well as cellular radio access to a packet-data network, thus supporting so-called dual-mode capability.

Client stations preferably access network 200 via one or more of the connected access networks, each of which comprises at least one switch, router, or similar entity that includes one or more interfaces to network 200. For example, cellular radio access to network 200 by wireless devices, such as exemplary AT 202, is provided by RAN 209. As illustrated in FIG. 2, RAN 209 comprises base transceiver station (BTS) 210 connected to the network via base station controller (BSC) 212, which in turn is connected both to the circuit-cellular network via MSC 214, and to the packet-data network via PDSN 218, by way of packet control function (PCF) 216. PDSN 218 also includes a connection to core network 220.

In typical operation of RAN 209, BTS 210 provides an air interface link to AT 202 (or similar device), while BSC 212 controls BTS 210, for example assigning specific air interface channels and managing mobility of AT 202 across possibly multiple BTSs under its control. For circuit-cellular services, such as circuit-based telephony, communications are then routed between BSC 212 and MSC 214, which in turn provides connectivity to core network 220, to one or more other MSCs or circuit telephony switches (either directly or via core network 220), or to PSTN 224 via digital trunks or similar links to a switch or switches in the PSTN. For packet-data services, such as web browsing and IP multi-media services, communications are instead routed between BSC 212 and IMS network 236 via packet network 222 and border router 242, by way of PCF 216 and PDSN 218.

More specifically, for data services, AT 202 (or similar cellular wireless device) will first establish a packet-data session in packet network 222 via PCF 216 and PDSN 218. The packet-data session provides the access terminal an IP address and establishes point of contact for IP communications with it. In exemplary operation, PDSN 218 in RAN 209 may receive an origination message from AT 202 (via BTS 210, BSC 212, and PCF 216), seeking to establish a packet-data session. Upon authentication and authorization of the user-subscriber via a query to AAA server 232, PDSN 218 may then grant the request. Exemplary packet data sessions could include a point-to-point protocol (PPP) session between AT 202 (or similar device) and the PDSN 218, and a mobile Internet Protocol (Mobile IP) session between AT 202 and a Mobile IP home agent (HA) 240. In response, PDSN 218 may negotiate with the AT 202 to establish a data-link layer connection, and PDSN 218 or HA 240 may assign an IP address for the AT 202 to use in communications in the packet network 222. A packet data session is thus established and packet data communications to and from AT 202 may then flow through the PDSN 218 during the session.

With a packet-data session established and an IP address assigned, the user of AT 202 may then engage in IP communications and multimedia services hosted in or supported by the IMS network 236. Additional details of IMS services and communications are discussed below.

The components of RAN 209 illustrated in FIG. 2 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 220 or other interconnecting network, for example. Still further, multiple metropolitan areas, each with a hierarchical arrangement of MSCs, BSCs, and BTSs, or with multiple RANs, for example, could be connected via the carrier's backbone network (e.g., core network 220). Similar arrangements of one-to-many are also possible for PDSNs-to-BSCs as well, as are other configurations. The above examples are not mean to be exhaustive or limiting.

Additionally, each functional element of RAN 209 may be implemented as a separate physical entity, or various combinations of them may be integrated into one or more physical platforms. For example, BTS 210 and BSC 212 may be implemented in a single physical device. Similarly, PCF 216 and PDSN 218 could be combined on a single platform. Other physical configurations of the functional elements of the RAN may also be realized.

Access to landline circuit-based services in network 200, such as conventional circuit-switched telephony, is preferably provided by landline circuit access network 225. Represented in FIG. 2 by a single service switching point (SSP) 226, landline circuit access network 225 typically comprises one or more conventional telephony switches (or similar network entities) at the end office (or offices) of a LEC, for instance, together with interconnecting digital trunks and tandem switches. Similarly to MSC 214, SSP 226 in turn provides connectivity to core network 220, to one or more other SSPs or MSCs (either directly or via core network 220), or to PSTN 224 via digital trunks or similar links to a switch or switches in the PSTN. Access by a device such as telephone 204 to SSP 226 could be via residential local loop, or a digital or analog line to an intervening PBX switch (not shown), for example. Other arrangements are possible as well.

Access to landline packet-data services in network 200, such as web browsing, VoIP, and email communications, is provided by landline packet access network 227. Represented in FIG. 2 by a single network access server (NAS) 228, landline packet access network 227 could comprise a local area network (LAN), such as an enterprise network, a packet-cable distribution system, a cable modem distribution system, a digital subscriber line (DSL) distribution system, or the like, which provides connectivity between landline subscriber stations and NAS 228. In turn, NAS 228, which could comprise one or more routers, DSL switches, cable modem termination systems, or remote-access chassis, for example, provides connectivity to IMS network 236 via packet network 222 and border router 242, as well as to core network 220. Alternatively or additionally, landline packet access network 227 may comprise a landline telephone system that provides dial-up connectivity between landline subscriber stations utilizing modems, for example, and NAS 228. Intelligent devices such as client station 208 may have wired connectivity, such as Ethernet, to landline packet access network 227. Preferably, landline packet access network 227 also includes one or more wireless access points (WAPs), such WAP 230, to support wireless WLAN access technologies, such as wireless Ethernet (IEEE 802.11), for example, for devices such as wireless client station 206.

Although not shown in FIG. 2, note that other switches may be present in the telecommunication network 200 as well, interconnected by core network 220 or other transport networks, for example. For instance, an inter-exchange carrier (IXC) may provide a switch (e.g., Nortel DMS-250) that serves a connection between LEC switches, MSCs or other regional telecommunication systems, so as to facilitate long distance and other inter-switch calling. As another example, private switches (e.g., PBX servers) might be provided to serve enterprises or other groups of subscribers (e.g., hotels, campuses, etc.) Other examples are possible as well.

Delivery of circuit services to users may involve additional network servers, entities, and subsystems which are part of network 200, but which have been omitted from FIG. 2 for the sake of brevity. For example, signaling for setup and management of circuit-based calls and services may be provided by a signaling subsystem/network such as SS7. Thus, while MSC 214 and SSP 226 may comprise certain aspects of an SS7 system, or the like, other elements that make up the system but are not shown could also be connected via core network 220. Delivery of packet-based services is discussed in the next subsection, "IMS-Based Services." While the emphasis in the present disclosure in relation to coordination of network resources for blended services is on packet-based services, in particular, IMS-bases services, it should be understood embodiments for circuit-based services are possible as well.

IMS-Based Services

Figure 3:
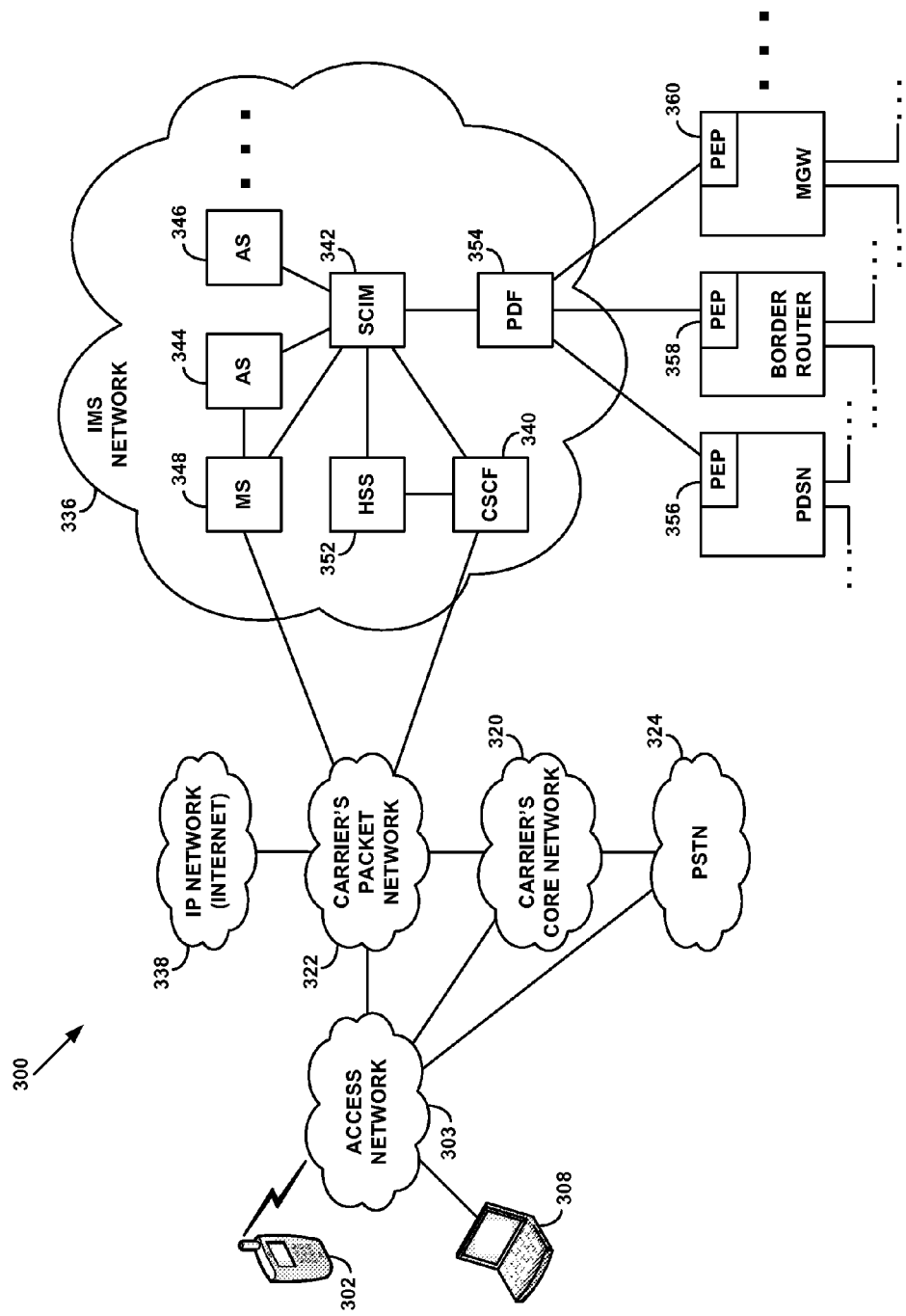
FIG. 3 is an exemplary representation of a carrier network in which coordination of network resources requested by a user for blended services can be carried out, wherein certain relevant details of the IMS network are shown.

An alternate representation of network 200 is shown in FIG. 3 as network 300. In the depiction of network 300, for the sake of brevity, the three access networks of FIG. 2 are rendered as just one, and their details, as well as those of some of the inter-network connections shown in FIG. 2, are omitted. Instead, the IMS network, relabeled in FIG. 3 as IMS network 336, is expanded to illustrate aspects related to service delivery and relevant to the discussion of coordinating network resources for blended services. It will be appreciated that IMS network 336 remains a simplified view of an IMS architecture resembling similar architectures developed under the auspices of 3GPP or 3GPP2, for example. Certain aspects of IMS network 336 represent and/or support improvements in delivery of services, as well as in the ability of a network operator to introduce new services, as described below. As an additional, minor difference between the two figures, only two client devices, wireless communication device (WCD) 302 and PC 308, are shown in network 300.

In FIG. 3, IMS network 336 is seen to comprise a Call Session Control Function (CSCF) 340 connected to SCIM 342 and to Home Subscriber Server (HSS) 352. CSCF 340 is also connected to packet network 322 for signaling communications between external networks and IMS network 336. Services in the 3G IMS network are based largely on SIP signaling and call control (among other protocols), and the CSCF typically incorporates the functions of a SIP proxy (and/or registrar) server into a framework suited for wireless user mobility.

As shown, HSS 352 is also connected to SCIM 342. In turn, SCIM 342 is additionally connected to application servers (ASs) 344 and 346, and media server (MS) 348, all of which are components of the IMS network. The ellipses to the right of AS 346 are meant to indicate that there could be additional application servers or media servers in the IMS network, each of which could be communicatively connected to the SCIM. Note that MS 348 also has an external connection to packet network 322 for transport of media data to and from external networks; this could be true of any additional media servers in IMS network 336 (but not shown in FIG. 3).

The application and media servers are the IMS components that actually host many of the services of the network. Thus, while much of the other infrastructure of the IMS (and more generally, the 3G) network supports signaling and control of services, as well transport of media, many of the services themselves are implemented as programs or applications on the application and media servers. The connection shown between AS 344 and MS 348 exemplifies the possibility that application and media servers could provide related or interdependent services as well. It will be appreciated that some services, such as peer-to-peer VoIP calls, may involve only signaling and media transport without any additional AS- or MS-based service components. However, IMS services are more generally considered to include server-based components, and one of the aims of the IMS architecture is to simplify the expansion of IMS service offerings.

In particular, the connections between the SCIM and the application and media servers depicted in IMS network 336 accommodate a predictable and systematic approach to service expansion through a framework of standard interfaces and connection points. Further, as an integration point in the IMS network for new and expanded services, the SCIM not only serves as an intermediary for service requests, but also advantageously acts a gateway between these servers and other support elements of the IMS (and more generally, the 3G) network. As such, the SCIM can facilitate the isolation and protection of sensitive network components, including, for instance, the HSS and even supporting subnetworks, from application and media servers that may need to access them but may lack appropriate interfaces and/or sufficient levels of trust.

Continuing with the description of IMS network 336, SCIM 342 is also advantageously connected to PDF 354. As discussed below, communication between SCIM 342 and PDF 354, which could be based on COPS, for instance, is one aspect of coordination of network resource allocation for blended services. Note in its role as a service gateway, the SCIM can provide intermediary communications between application and media servers and the PDF, the HSS, and the CSCF, among other elements of the IMS network.

Also shown in this illustration, PDF 354 is connected to Policy Enforcement Points (PEPs) 356, 358, and 360, which are in turn depicted as respective components in a PDSN, a border router, and a media gateway (MGW). Each of these network elements—the PDSN, border router, and media gateway—represents network resources that could be required to support one or more IMS-based services. The ellipses to the right of the media gateway are meant to indicate that there could be additional network resources with respective PEPs that communicate with PDF 354. In order to emphasize the relationship between PDF 354 and each of the PEPs that enforce resource allocation policy, these network elements are shown architecturally out-of-place, without reference to their actual locations in network 300 or to the other network components that they interconnect. However, as signified by the symbolic communication links connected at the bottom of each of these elements, it should be understood that each of these network elements has a place in the network, as discussed in connection with network 200 in FIG. 2, for example.

In a preferred embodiment, a user may request an IMS service by issuing a SIP INVITE message from a client device, such as WCD 302, to CSCF 340. In practice, CSCF 340 may be deployed as three separate CSCFs (not shown) that act together to support user mobility. Specifically, WCD 302 may register via a proxy CSCF (P-CSCF), which becomes a first point of contact for SIP messages to and from the client device. The P-CSCF then communicates with an interrogating CSCF (I-CSCF), which in turn communicates with the user's home or serving CSCF (S-CSCF). The user actually registers with the S-CSCF, which can then process the user's service requests. The P-CSCF provides a local signaling contact point when the user is "away from home," while the I-CSCF acts as a sort of signaling gatekeeper between the P-CSCF and S-CSCF when they reside in different networks, for example. Through their collective actions, the three CSCFs process and route SIP (or other) signaling messages on behalf of a user, and in the service of establishing media sessions.

In the context of the present discussion, it is sufficient to consider only the S-CSCF in with regard to coordination of network resource allocation for blended services, because it is typically the S-CSCF that communicates with the SCIM. While a user may issue a plurality of services requests that traverse a P-CSCF and I-CSCF before arriving at the user's S-CSCF, coordination of network resource allocation largely begins when the SCIM (or some other network entity having similar functions) receives the plurality of requests from the S-CSCF. Thus, there is no loss of generality with respect to the present invention in depicting just a single CSCF 340, as in FIG. 3. Further, it is possible for a single CSCF to incorporate the functions of all three CSCFs, acting as one or another depending on the specific communication being processed. Note that if the user is already in his or her home network, then only the S-CSCF may be involved in any case. It will be appreciated that the arrangement of CSCFs described above is exemplary, and other signaling architectures could be used as well without limiting the scope or spirit of the present invention.

When a user first registers in the IMS network, CSCF 340 will send a request to HSS 352 for the user's profile. The request may also involve some form of user authentication and authorization as well. Through the user profile, the CSCF may determine the services to which a user has subscribed, and how to handle calls and other media sessions involving the user. As the user's registrar, the CSCF also becomes a point of contact (possibly by way of a P-CSCF) for other users and services involved in SIP-based communications with the user.

As noted above, a user may initiate a plurality of service requests by issuing (via a client device) one or more SIP INVITE messages to the CSCF. Upon receiving the service request messages (i.e., SIP INVITE messages) from the user, CSCF 340 may consult the user profile and possibly modify the content of the messages according to information in the profile. The CSCF then forwards the service requests to SCIM 342, which in turn may evaluate the service requests for potential interactions, possibly modifying one or more of the requests if necessary. In accordance with a preferred embodiment, the SCIM may also compute the total network resource requirements for the associated services, and then request allocation of those resources from PDF 354. The PDF, in turn, may communicate with relevant PEPs in order to reserve resources if they are available. Once the resources have been reserved, the SCIM forwards the SIP INVITE messages to the appropriate application and/or media servers in order to initiate the requested services. The SCIM's actions thus not only help avoid undesirable service interactions, but also keep track of the total network resource requirements associated with the blend of requested services and ensure that they are available before launching the requested services.

Advantageously, the SCIM may also report the user's total resource allocation to a billing and accounting server in the network, thus helping to consolidate the recording and reporting of network resource usage by the user. This information might otherwise have to be collected from all the disparate resources that are tapped in the course of delivering concurrent blended services to the user.

The coordinating actions of SCIM 342 may be further understood by way of an example. Suppose a user at WCD 302 places a VoIP call to a party in the PSTN and also launches a server-based streaming audio broadcast to be mixed in with the VoIP call. A SIP INVITE for the VoIP call would preferably include a called-party phone number that identifies a destination in the PSTN. As described above, SCIM 342 will preferably receive this message from the CSCF 340, and might thus recognize a resource requirement for a media gateway channel for interconnecting (i.e., transcoding) an RTP media stream from the IP-side of the call with a PSTN circuit (e.g., a DS0) on the PSTN-side of the call. Additionally, the IP media-stream segment of the call may need to traverse a border router, so the SCIM will also recognize a resource requirement for network bandwidth to support the call. A SIP INVITE message to a media server that hosts the audio broadcast may similarly be used to initiate a broadcast media session. The SCIM, also receiving this message, may thus determine a resource requirement for additional network bandwidth from the border router. For example, the bandwidth requirement could be included in some manner in the SIP INVITE message. Alternatively, the SCIM could query the media server in order to determine the bandwidth requirement for the requested broadcast. Finally, the SCIM may recognize a resource requirement for an upgraded packet-data channel from the user's current PDSN to support the total additional IP traffic volume.

The total network resource requirement for this example then comprises two contributions to network bandwidth, preferably obtainable from a border router, one media gateway channel, preferably obtainable from a media gateway, and some form of expanded IP traffic volume support, preferably obtainable from a PDSN. SCIM 342 may then send a resource request message to PDF 354 in order to reserve these resources, if they are available. PDF 354 in turn may communicate with PEP 356 in the PDSN to determine if it can support the required IP traffic volume. Similarly, the PDF may communicate with PEP 358 in the border router to determine if it can allocate the required network bandwidth, and with PEP 360 in the MGW to determine if a required media gateway channel is available. Alternatively, PDF 354 may periodically monitor these (and possibly other) PEPs for resource allocation status, so that when it receives the resource request from SCIM 342 it can already be aware of resource availability without necessarily having to responsively check with each PEP. In any case, if the resources are available, PDF 354 may then instruct each PEP to reserve their respective resource, and then report the successful allocations back to SCIM 342. If one or more of the resources are not available, the PDF may report the failure to allocate some or all of the resources back to the SCIM.

Once the SCIM receives confirmation that the resources are reserved, it may then proceed with initiating the requested services. In the present example, the SCIM would forward the SIP INVITE message for the VoIP call to an appropriate signaling entity, such a CSCF that establishes SIP calls through the MGW. The SCIM would also forward the SIP INVITE message for the audio broadcast to the media server that hosts the service. The service setup would then proceed as usual. Note that if the PDF reported that some or all of the requested resources were not available, or if allocation of the resources failed for some other reason, then the SCIM would preferably deny one or more or the service requests, or possibly modify the requests to accommodate the level of allocation that was achieved. The embodiment illustrated through the above example could have a number of additional or alternative aspects. For instance, once SCIM 342 determines the total network resource requirements for the blended services requested by the user, it may, prior to sending a resource request to the PDF, query HSS 352 to determine if the user is authorized to acquire the total network resources. In this case, only if such authorization is verified, the SCIM may then send the resource request to PDF 354. In this way, resource availability is only one necessary condition, another being user authorization (as a precondition). Further, SCIM 342 could send a separate resource request for the respective resource requirement of each service requested by the user. The PDF could correspondingly send a separate reply for each request. Further still, each of the one or more resource requests from the SCIM to the PDF could be used first to establish the availability of the associated resource, whereby one or more requests to actually reserve or allocate the resources could be made subsequently only if availability were established.

In an alternative embodiment, the plurality of service requests could be received sequentially by the SCIM. Considering again the above example, the user might first request to set up the VoIP call. Then at some later time, after the call is active, the user may request to add in the streaming audio broadcast. For this embodiment, the SCIM would keep a running tally of the resources requested and allocated to the user, sending resources requests to the PDF in the same order in which service requests were received at the SCIM.

Similarly to the previous embodiment, the SCIM could make authorization (e.g., via a query to the HSS) a precondition for requesting resource allocation. In the case of sequential requests, authorization might be requested for a running total of resource requirements following receipt of each new service request and a corresponding increment to the running total. And again, as with the previous embodiment, the resource requests could result directly in resource allocation, or could be used to establish resource availability, with resource allocation requested only if availability were first established.

It will be appreciated that various methods and protocols are available for implementing reservation and/or allocation of network resources prior to, or in the process of, initiating network services. The steps and communications outlined in the above examples represent generalized approaches that could be taken. Specific protocols such as COPS and the IP standard Resource Reservation Protocol (RSVP) could require particular messages and transactions that have been omitted for the sake of brevity from the simplified description presented here. The absence of detailed explanations of these well-known standards should not be viewed as limiting with respect to present invention.

Finally, it should be noted that the architecture of IMS network 336 is exemplary, and that alternative arrangements are possible. In particular, the functions related to coordination of resources for blended services requested by a user could be carried out by network entities other than the SCIM. For example, the CSCF could implement these functions. Further, the SCIM itself could be integrated into the CSCF or other signaling and control entity in the network. It will be appreciated that coordination of network resources for blended services could be carried out in an IMS (or other packet-based service network) constructed according to these and other possible alternative architectures and configurations while remaining within the scope and spirit of the present invention.

Exemplary Operation of Coordination of Network Resources for Blended Services

Figure 4:
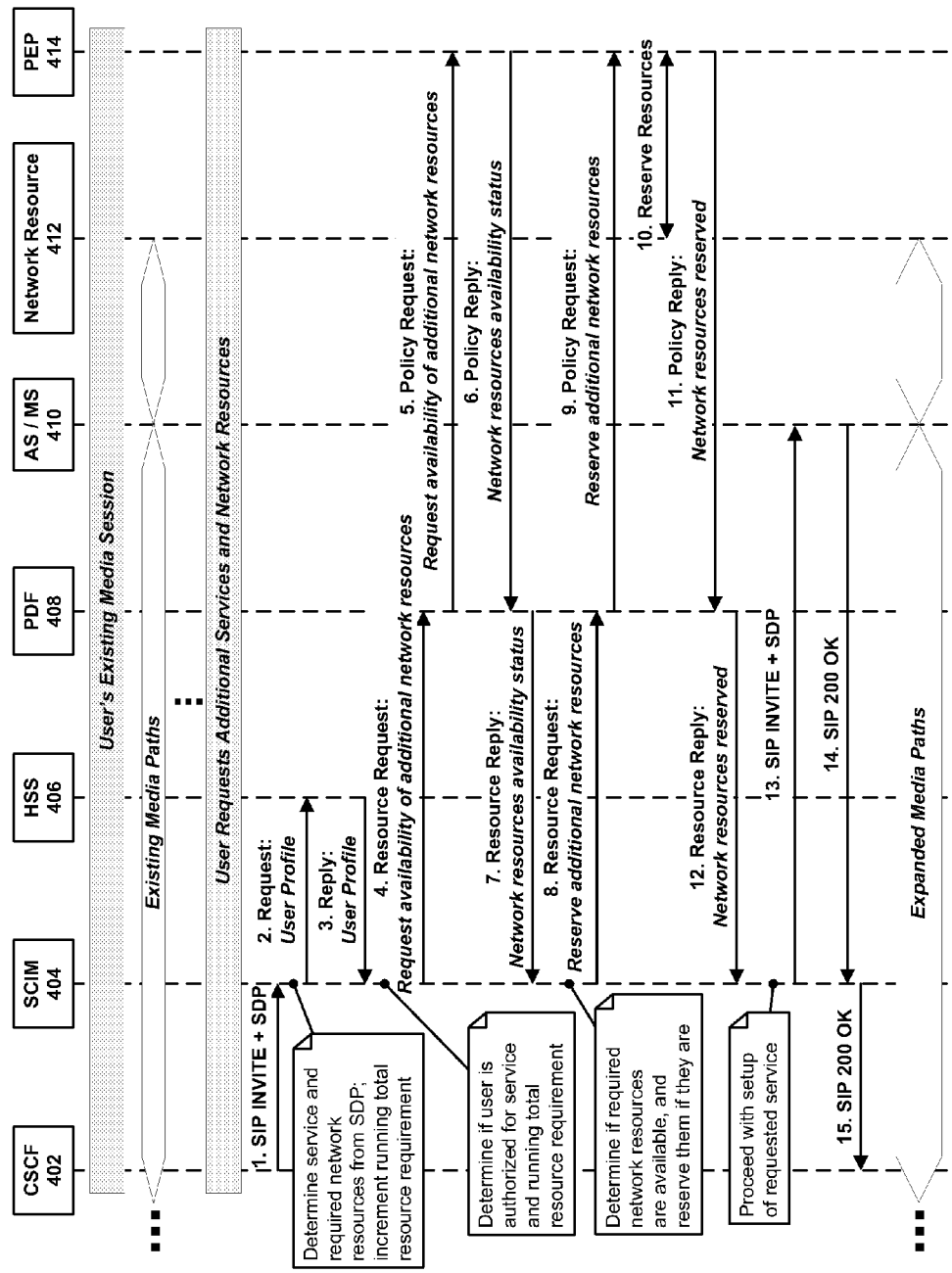
FIG. 4 is an exemplary pseudo-call-flow illustrating the operation of coordinating network resources requested by a user for blended services in a network, with respect to the components and entities involved and the information that passes between them in the process.

Exemplary operation of coordination of network resources for blended services requested by a user may be understood with reference to FIG. 4, which shows a pseudo-call-flow illustrating example steps and interacting network components. The embodiment represented in FIG. 4 corresponds to sequential reception at the SCIM of service request messages. In particular, the pseudo-call-flow depicted begins while the user already has an active media session underway, as indicated by a first banner at the top labeled "User's Existing Media Session" and the band labeled "Existing Media Paths" just below the first banner. After some time, symbolized by the vertical ellipses, the user requests additional services, as indicated by a second banner with a label descriptive of the user's requests. The process begins just below the second banner. Hence, the service request(s) of the pseudo-call-flow are sequential at least with respect to any requests that set up the existing media session. As discussed above, a user's service requests are received at the SCIM by way of the CSCF, so the pseudo-call-flow in FIG. 4 picks up the message flow from the CSCF, omitting all elements and messages leading up to the CSCF.

A user's service request in the form of a SIP INVITE message is sent from CSCF 402 to SCIM 404 at step (1). The message includes a session description, preferably encoded according to the "Session Description Protocol" (SDP). The session description may comprise various characteristics of the requested session, including information indicative of required network resources. Thus, as indicated by the first notation in the figure, SCIM 404 may determine from the message and the SDP what service is being requested and what network resources are required. For example, streaming video may require some minimum amount of network bandwidth to guarantee a particular level of QoS. Since the user already has an existing media session underway, the network resource requirement associated with this new request represents additional resources, so the SCIM increments a running total resource requirement (also as indicated by the first notation).

Alternatively or additionally, the SCIM may identify an application or media server that will ultimately be the target of the service request, and send a query to that server in order to help determine what network resources will be required for delivery of the service. In the present example, the destination of the SIP INVITE message may be application or media server (AS/MS) 410. The SCIM might then query this server to learn what resources are required. Other means of determining the resource requirements are possible as well.

At step (2), SCIM 404 sends a request to HSS 406 for the user's profile, which the HSS returns in it reply at step (3). As indicated by the second notation, the SCIM uses the profile to determine if the user is authorized to acquire the running total resource requirement, and if so, sends a resource request to PDF 408 to enquire if the resource requirement for the requested service is available. Note that the existence of a previous media session implies that the user was authorized to acquire any network resources required of the associated service. The step of checking for authorization of the new running total resource requirement (after the increment) places with the SCIM the responsibility of ensuring that the user does not, through multiple service requests, acquire more resources than he or she is permitted.

The SCIM sends a resource request message to PDF 408 at step (4), thus utilizing the advantageous communication link between the SCIM and the PDF. The PDF, in turn, sends a corresponding policy request message to PEP 414 step (5). Both request messages could be based on COPS or some other standard protocol suitable for managing network resources for user services. At step (6), the PEP replies to the PDF, which then replies at step (7) to the SCIM. At this point SCIM 404 may determine if the required resources for the requested service are available, and request they be reserved if they are available, as indicated by the third notation.

Under the assumption in this example that the required resources are available, SCIM 404 sends a request to PDF 408 to reserve them at step (8). The PDF, in turn, sends a corresponding policy request message to PEP 414 at step (9). Again, both request messages could be based on COPS, for example.

At step (10), PEP 414 communicates with network resource 412 to reserve the required resources associated with the requested service. In FIG. 4, both PEP 414 and network resource 412 are not specified in detail. In view of the discussion of the IMS network in FIG. 3, examples of network resources include, without limitation, border routers, media gateways, and PDSNs. In practice, the communications represented in step (10) could take place between one or more PEPs and associated network resource components, and be based on one or more protocols or interfaces.

PEP 414 sends a policy reply to PDF 408 at step (11) indicating that the required resources have been reserved. At step (12), the PDF sends a resource reply to SCIM 404, also indicating successful reservation of the required resources.

Note that in this exemplary call flow, the SCIM's steps of determining whether or not the resources are available and requesting that they be reserved are separate, the latter step only being taken if the former yields a positive determination. As an alternative, these steps could be combined so that the SCIM would request reservation, receiving either success or failure depending on availability.

Once the required resources have been reserved, SCIM 404 proceeds with facilitating setup of the requested service, as indicated by the fourth notation. Thus, at step (13), the SCIM forwards the SIP INVITE, including the SDP, to an appropriate application or media server (AS/MS) 410. Server 410 replies with a SIP 200 OK message at step (14), which is the forward back from the SCIM to CSCF 402 at step (15). Once the SIP OK is received by the user's client device (not shown), the session associated with the requested service will be operable. This is indicated by the band labeled "Expanded Media Paths" that replaces the band for the original existing media paths. Note that the expanded media paths (as well as the original media paths) are depicted as traversing both AS/MS 410 and network resource 412. This is meant to signify the role of the network resource in supporting the requested services. Also note that the "Expanded Media Paths" band is wider that the "Existing Media Paths" band, signifying the increased resource allocation.

It will be appreciated that pseudo-call-flow of FIG. 4 corresponds to a generalized illustration of coordination of resources for blended services request by a user. Some steps are represented as pseudo-protocol messages, such as those in steps (4)-(8), for instance. Others, such as steps (1) and (13)-(15) comprise abbreviations of SIP messages, and do not necessarily include intermediate messages that might be part of a transaction in practice. Alternative and/or additional steps and messages could be used without departing from the scope and spirit of the present invention.

Exemplary Network Server Device

Figure 5:
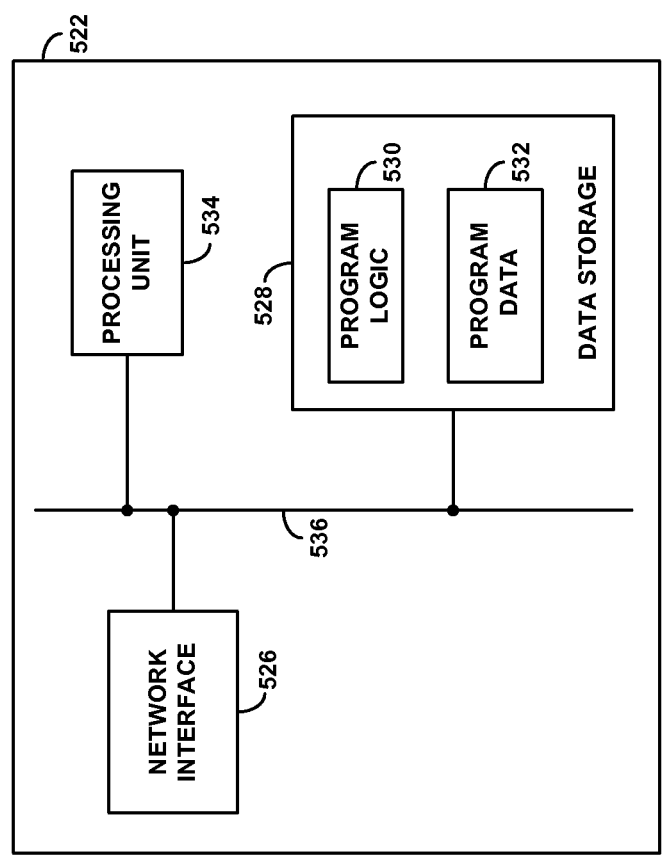
FIG. 5 is an exemplary illustration of the functional architecture of a network entity that can carry out coordination of network resources requested by a user for blended services in a network.

FIG. 5 is a simplified block diagram depicting functional components of an example SCIM 522 arranged to carry out the functions described above. As shown in FIG. 5, the example SCIM 522, representative of SCIM 342 FIG. 3, for instance, includes a network interface 526, a processing unit 534, and data storage 528, all of which may be coupled together by a system bus 536 or other mechanism. In addition, the SCIM may also include external storage, such as magnetic or optical disk storage, although this is not shown in FIG. 5.

Network interface 526 enables communication on a network, such as IMS network 336. As such, network interface 526 may take the form of an Ethernet network interface card that can be coupled with a router or switch to a network such as IMS network 336, for example, or connected to a subnet, which in turn is coupled to core network 336. By way of example, the subnet could be a LAN that interconnects components that comprise a service-delivery subsystem. Example components could include external disk storage for content in the form of data files, and an operator interface for provisioning the subsystem. Alternatively, network interface 526 may take other forms, providing for wired and/or wireless communication on a network or a subnet.

Processing unit 534 comprises one or more general purpose processors and/or one or more special purpose processors. And data storage 528 comprises one or more volatile and/or non-volatile storage components, which can be integrated in whole or in part with processing unit 534. As further shown, data storage 528 is equipped to hold program logic 530 and program data 532.

Program logic 530 preferably comprises machine language instructions that are executable by processing unit 534 to carry out various functions described herein. By way of example, the program logic 530 may be executable by processing unit 534 to receive a plurality of service requests from a user for blended services, the plurality of requests arriving by way of a signaling entity, such as CSCF 340, via at network interface 526. Further, the program logic 530 is preferably executable by processing unit 534 to process the plurality of service requests and responsively communicate with other IMS components, such as HSS 352, PDF 354, AS 344, AS 348, and MS 348 to carry out functions such as those described above. Again, all communications are preferably carried out via network interface 526.

According to a preferred embodiment, a plurality of service requests from a user will arrive at network interface 526, the requests having been generated and transmitted by a client station (e.g., AT 302) and transmitted by way of one or more CSCFs, as described above. A program executing according to instructions from program logic 530 in processing unit 534 may then analyze and process the requests, for example determining for each a respective network resource requirement, adding each respective network resource requirement into a running total network resource requirement, generating a resource request message for each service request, and sending the resource request message to a resource management element in the network, such as PDF 354.

The program could further execute to verify, prior to sending each resource request message, that the user is authorized to acquire the running total network resource requirement, by sending a resource authorization request to an authorization server in the network, such as HSS 352. A response from the authorization server would preferably contain information indicative of whether or not the user is authorized to acquire at least the running total network resource requirement. The program could then execute to process and analyze the response, and then send the resource request only if authorization is verified. The program could further execute to grant the service request conditioned on successful reservation of the network resource requirement associated with the service request, as indicated in one or more responses from the resource management element.

One skilled in the art will recognize that the operation of SCIM 522 with respect to the functions described herein could be put into practice in numerous ways, while remaining within the scope and spirit of the present invention.

CONCLUSION

An exemplary embodiment of the present invention has been described above. Those skilled in the art will understand, however, that changes and modifications may be made to the embodiment described without departing from the true scope and spirit of the invention, which is defined by the claims.

What is claimed:

1. A method of coordinating network resources for blended services in a network, the method comprising the following steps:

at a network entity, receiving a plurality of service requests from a user to initiate a corresponding plurality of services for the user, each respective service request of the plurality of service requests being associated with a respective service of the corresponding plurality of services;

prior to initiating at least one of the corresponding plurality of services, determining, at the network entity, for each respective service request a respective network resource requirement for the associated service;

at the network entity, based on the determined respective network requirements, computing for the plurality of service requests a total network resource requirement for the associated services; and sending a resource request from the network entity to a resource management element in the network for reservation of the total network resource requirement prior to initiating at least one of the corresponding plurality of services, wherein the steps of determining and computing are both carried out for each of a plurality of types of network resource, thereby yielding a respective total network requirement for each of the plurality of types of network resource, and wherein sending the resource request from the network entity comprises one of: sending for each of the plurality of types of network resource a separate resource request for reservation of the respective total network requirement, or sending a single resource request for reservation of all of the respective total network requirements.

2. The method of claim 1, further comprising:
  at the network entity, prior to the step of sending the resource request, making a determination of whether the user is authorized to reserve at least the total network resource requirement; and
  carrying out the step of sending the resource request only if the determination is that the user is authorized to reserve at least the total network resource requirement.

3. The method of claim 2, wherein making the determination of whether the user is authorized to reserve at least the total network resource requirement comprises:
  sending a resource authorization request from the network entity to an authorization server in the network, the resource authorization request containing information indicative of the user, the total network resource requirement, and the corresponding plurality of services; and
  at the network entity, receiving a response from the authorization server, the response containing at least an indication of whether or not the user is authorized to reserve at least the total network resource requirement.

4. The method of claim 3, wherein the network entity comprises a Service Capability Interaction Manager (SCIM), the resource management element comprises a Policy Decision Function (PDF), the SCIM and PDF communicate with each other using Common Open Policy Server (COPS) protocol, and the authorization server comprises a Home Subscriber Server (HSS), and wherein:
  receiving the plurality of service requests from the user comprises receiving the plurality of service requests from a Call Session Control Function (CSCF) on behalf of the user.

5. The method of claim 1, further comprising:
  at the network entity, receiving a response from the network resource manager indicating whether or not reservation of the total network resource requirement was successful; and
  at the network entity, granting all of the plurality of service requests only if the response indicates that reservation of the total network resource requirement was successful.

6. The method of claim 5, wherein granting all of the plurality of service requests comprises:
  at the network entity, for each respective service request, identifying a corresponding service element in the network that functions to deliver the service associated with the service request; and
  sending a service-initiation request from the network entity to the corresponding service element to initiate the service on behalf of the user.

7. The method of claim 6, wherein the corresponding service element is one of one or more service delivery platforms each communicatively coupled with the network entity, the method further comprising:
  by way of the network entity, providing intermediary communications between each of the one or more service delivery platforms and a network element selected from a group consisting of the resource management element, an authorization server in the network, and a signaling server in the network.

8. The method of claim 6, wherein at least one service request comprises a request for network media transport service, and wherein sending a service initiation request comprises sending a signaling message using a signaling protocol to establish a media session associated with the network media transport service.

9. The method of claim 8, wherein the network media transport service is enabled according to Real-time Transport Protocol (RTP), the signaling protocol is Session Initiation Protocol (SIP), the media session comprises an RTP session, and the service element in the network comprises a media server, and wherein sending the signaling message comprises sending a SIP INVITE message.

10. The method of claim 5, further comprising sending a message from the network entity to a billing and accounting server in the network, the message containing information indicative of the user, the total network resource requirement, and the corresponding plurality of services, and the message being usable by the billing and accounting server for determining one or more charges to apply to the user for the corresponding plurality of services.

11. The method of claim 1, wherein each respective network resource requirement and the total network resource requirement correspond, respectively, to a quantity of network resource, the network resource comprising network bandwidth, air channel capacity, network capacity, or virtual circuits.

12. A method of coordinating network resources for blended services in a network, the method comprising the following steps:
  at a network entity, receiving, in a sequence, a plurality of service requests from a user to initiate a corresponding plurality of services for the user, each respective service request of the plurality of service requests being associated with a respective service of the corresponding plurality of services;
  prior to initiating at least one of the corresponding plurality of services, responsive to receipt of each respective service request, determining, at the network entity, a respective network resource requirement for the associated service;
  at the network entity, responsive to determining the respective network resource requirement, adding the respective network resource requirement into a running a total network resource requirement for the services associated with all service requests of the plurality of service requests so far received; and
  following the step of adding, sending a resource request from the network entity to a resource management element in the network for reservation of the respective network resource requirement prior to initiating at least one of the corresponding plurality of services,
  wherein the steps of determining and adding are both carried out for each of a plurality of types of network resource, thereby yielding a respective total network requirement for each of the plurality of types of network resource, and
  wherein sending the resource request from the network entity comprises one of:
  sending for each of the plurality of types of network resource a separate resource request for reservation of the respective total network requirement, or sending a single resource request for reservation of all of the respective total network requirements.

13. The method of claim 12, further comprising:
  at the network entity, prior to the step of sending the resource request, making a determination of whether the user is authorized to reserve at least the running total network resource requirement; and
  carrying out the step of sending the resource request only if the determination is that the user is authorized to reserve at least the running total network resource requirement.

14. The method of claim 13, wherein making the determination of whether the user is authorized to reserve at least the running total network resource requirement comprises:

sending a resource authorization request from the network entity to an authorization server in the network, the resource authorization request containing information indicative of the user, the running total network resource requirement, and the service associated with the respective service request; and at the network entity, receiving a response from the authorization server, the response containing at least an indication of whether or not the user is authorized to reserve at least the running total network resource requirement.

15. The method of claim 14, wherein the network entity comprises a Service Capability Interaction Manager (SCIM), the resource management element comprises a Policy Decision Function (PDF), the SCIM and PDF communicate with each other using Common Open Policy Server (COPS) protocol, and the authorization server comprises a Home Subscriber Server (HSS), and wherein:

receiving the plurality of service requests from the user comprises receiving the plurality of service requests from a Call Session Control Function (CSCF) on behalf of the user.

16. The method of claim 12, further comprising:

at the network entity, receiving a response from the network resource manager indicating whether or not reservation of the respective network resource requirement was successful; and at the network entity, granting the respective service request only if the response indicates that reservation of the respective network resource requirement was successful.

17. The method of claim 16, wherein granting respective service request comprises:

at the network entity, identifying a service element in the network that functions to deliver the service associated with the respective service request; and sending a service-initiation request from the network entity to the corresponding service element to initiate the service on behalf of the user.

18. The method of claim 17, wherein the service request comprises a request for a network media transport service, and sending a service initiation request comprises sending a signaling message using a signaling protocol to establish a media session associated with the network media transport service.

19. The method of claim 18, wherein the network media transport service is enabled according to Real-time Transport Protocol (RTP), the signaling protocol is Session Initiation Protocol (SIP), the media session comprises an RTP session, and the service element in the network comprises a media server, and wherein sending the signaling message comprises sending a SIP INVITE message.

20. The method of claim 12, wherein the respective network resource requirement and the running total network resource requirement each correspond, respectively, to a quantity of network resource, the network resource comprising network bandwidth, air channel capacity, network capacity, or virtual circuits.

21. A system for coordinating network resources for blended services in a network, the system comprising:

a processor;
a network interface;
data storage; and
machine language instructions stored in the data storage and executable by the processor to:

(a) receive, via the network interface, a plurality of service requests from a user to initiate a corresponding plurality of services for the user, each respective service request of the plurality of service requests being associated with a respective service of the corresponding plurality of services; and (b) responsive to receipt of each respective service request:

(b.i) prior to initiating at least one of the corresponding plurality of services, determine a respective network resource requirement for the associated service from a plurality of types of network resource;

(b.ii) add the respective network resource requirement into a running a total network resource requirement for the services associated with all service requests of the plurality of service requests so far received, and thereby yield a respective total network requirement for each of the plurality of types of network resource; and (b.iii) via the network interface, send a resource request to a resource management element in the network for reservation of the respective network resource requirement prior to initiating at least one of the corresponding plurality of services, wherein sending the resource request comprises one of: sending for each of the plurality of types of network resource a separate resource request for reservation of the respective total network requirement, or sending a single resource request for reservation of all of the respective total network requirements.

22. The system of claim 21, wherein the machine language instructions stored in the data storage are further executable by the processor to:

prior to sending the resource request, make an authorization determination, the authorization determination being indicative of whether the user is authorized to reserve at least the running total network resource requirement; and send the resource request only if the authorization determination is that the user is authorized to reserve at least the running total network resource requirement.

23. The system of claim 22, wherein the machine language instructions executable by the processor to make the authorization determination comprise machine language instructions executable by the processor to:

via the network interface, send a resource authorization request to an authorization server in the network, the resource authorization request containing information indicative of the user, the running total network resource requirement, and the service associated with the respective service request; and via the network interface, receive a response from the authorization server, the response containing at least an indication of whether or not the user is authorized to reserve at least the running total network resource requirement.

24. The system of claim 21, wherein the machine language instructions stored in the data storage are further executable by the processor to:

via the network interface, receive a response from the network resource manager indicating whether or not reservation of the respective network resource requirement was successful; and grant the respective service request only if the response indicates that reservation of the respective network resource requirement was successful.

25. The system of claim 24, wherein the machine language instructions executable by the processor to grant the respective service request comprise machine language instructions executable by the processor to:
- identify a corresponding service element in the network that functions to deliver the service associated with the respective service request; and
- via the network interface, send a service-initiation request to the corresponding service element to initiate the service on behalf of the user.

26. The system of claim 25, wherein the corresponding service element is one of one or more service delivery platforms each communicatively coupled with the system via the network interface, and wherein the machine language instructions stored in the data storage are further executable by the processor to:
- provide intermediary communications between each of the one or more service delivery platforms and a network element also communicatively coupled with the system via the network interface, the network element being selected from a group consisting of the resource management element, an authorization server in the network, and a signaling server in the network.

* * * * *